Dec. 13, 1932.  J. M. EDWARDS  1,890,642
COFFEE ROASTER
Filed July 15, 1929  11 Sheets-Sheet 1

Inventor:
J. M. Edwards,
By Mason Fenwick & Lawrence,
Attorneys.

Dec. 13, 1932.  J. M. EDWARDS  1,890,642
COFFEE ROASTER
Filed July 15, 1929  11 Sheets-Sheet 2

Dec. 13, 1932.   J. M. EDWARDS   1,890,642
COFFEE ROASTER
Filed July 15, 1929   11 Sheets-Sheet 7

Inventor:
J. M. Edwards,
By Mason, Fenwick & Lawrence,
Attorneys.

Dec. 13, 1932.   J. M. EDWARDS   1,890,642
COFFEE ROASTER
Filed July 15, 1929   11 Sheets-Sheet 8
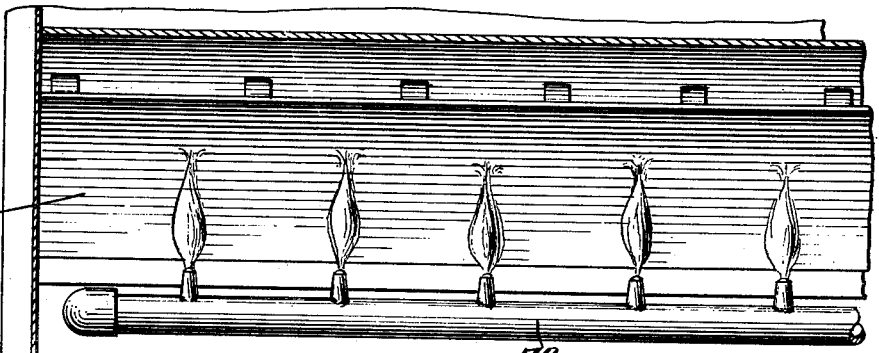

Dec. 13, 1932.     J. M. EDWARDS     1,890,642
COFFEE ROASTER
Filed July 15, 1929     11 Sheets-Sheet 9
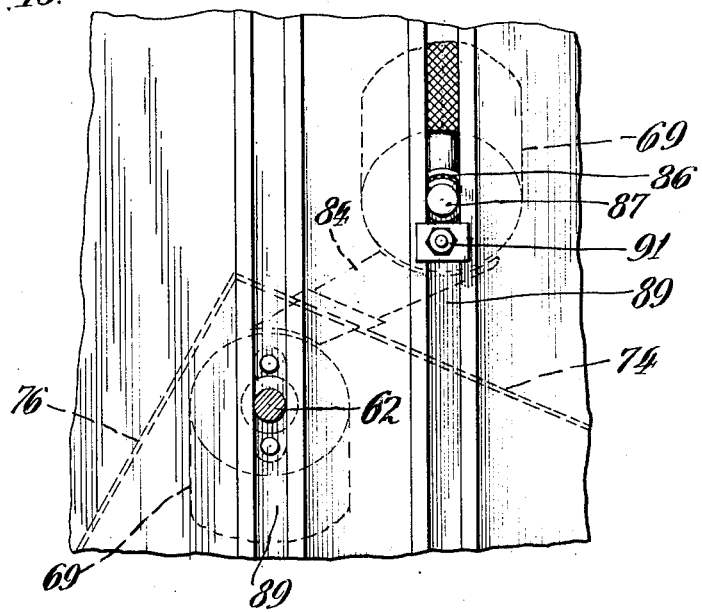
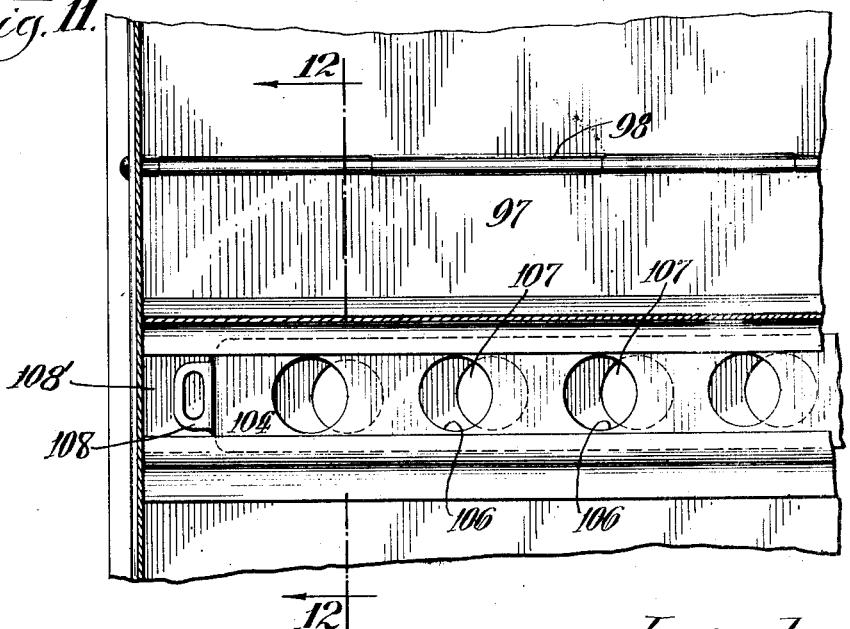
Inventor:
J. M. Edwards,
By Mason, Fenwick & Lawrence
Attorneys.

Dec. 13, 1932.　　　　J. M. EDWARDS　　　　1,890,642
COFFEE ROASTER
Filed July 15, 1929　　　11 Sheets-Sheet 10

Inventor:
J. M. Edwards,
By Mason, Fenwick & Lawrence,
Attorneys.

Dec. 13, 1932.                J. M. EDWARDS                1,890,642
                              COFFEE ROASTER
                        Filed July 15, 1929     11 Sheets-Sheet 11
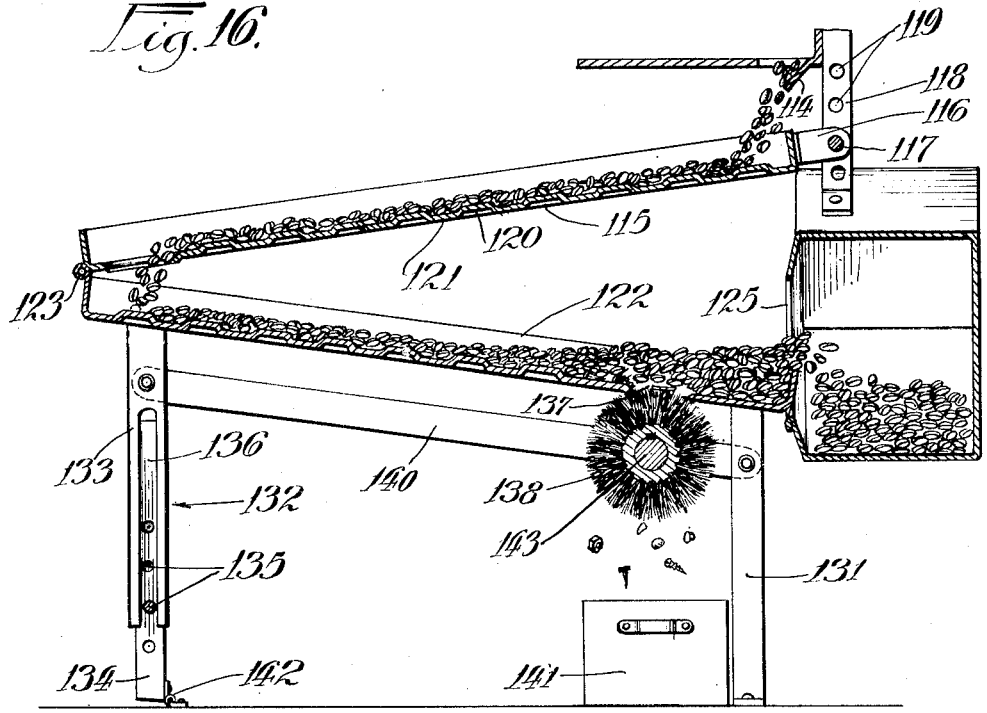
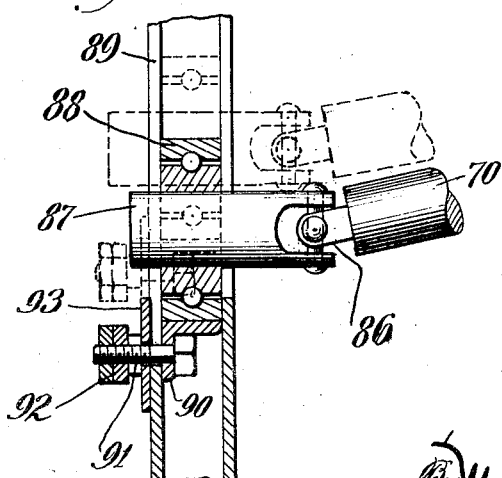
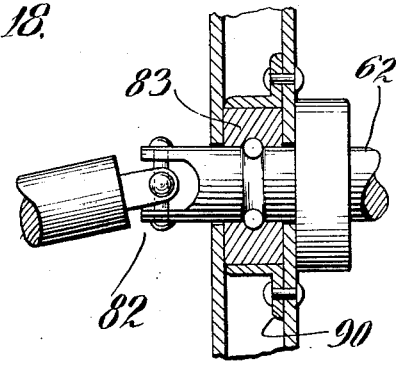
Inventor:
J. M. Edwards,
By Mason, Fenwick & Lawrence,
Attorneys.

Patented Dec. 13, 1932

1,890,642

UNITED STATES PATENT OFFICE

JAMES M. EDWARDS, OF CHICAGO, ILLINOIS

COFFEE ROASTER

Application filed July 15, 1929. Serial No. 378,370.

This invention relates to roasters, and more particularly to a roaster of the continuously operating type.

The object of the invention is primarily to provide an improved roaster of the continuous operating type in which, more particularly coffee, peanuts or the like, is preheated and cleaned before passing into successive roasting cylinders there to be subjected to the action of the roasting heat, without direct contact with the flame, the chaff and other foreign matter being discharged at the end of the preheating cylinder, which serves to screen the coffee or the like from foreign matter as it is conveyed to the first roasting cylinder during the preheating operation, all refuse or foreign matter being discharged into a chute where it may be readily precleaned and the coffee passing from one roasting cylinder to the next through a series of steps, being subsequently delivered into a shaker which acts as a cooling means and also serves to clean any foreign matter which may have been carried along with the coffee, any heavy objects passing along therewith being discharged by gravity.

A further object of the invention is to provide means for forcing a draft of air through the preheating cylinder and chamber to draw off light particles of foreign matter in addition to the heavy particles that might be likely to fall through, and which are subsequently removed during the cooling operation, thereby insuring a continuous roasting of the coffee without allowing the coffee to bunch or remain in batches, thereby securing uniform and proper roasting and producing a machine which may be operated for relatively long periods with a large capacity and increased output over any roasters heretofore produced.

Another object of the invention is to provide a novel arrangement of drive means for the preheating and roasting cylinders, suction fans and endless feeding mechanisms for discharging the coffee into the preheating and screening cylinder, as well as to provide a novel form of shaker and cooler for the roasted coffee after discharge from the roasting cylinders.

Another object of the invention is to provide novel means for independently regulating the temperature in the respective chambers of the roasting cylinders so that the temperature may be made uniform or gradually increase in the order in which the coffee passes into said respective roasting cylinders until it is discharged in a roasted state at the bottom of the machine.

Another object of the invention is to provide a novel arrangement of burners and roasting cylinders together with an adjusting means for the cylinders so that they may be arranged at any desired angle of inclination for varying the time duration in which it takes the coffee to pass through the same and therefore, through the entire machine during the roasting operation and speed of roasting.

Another object of the invention is to provide novel feeding means for continuously feeding the coffee into the preheating and cleaning cylinder.

Another object of the invention is to prevent the coffee from running in batches through the machine by uniformly and evenly distributing it over the respective cylinders during its passage through the machine.

Another object of the invention is to provide a novel cooling device and stoner which receives the coffee after it is discharged from the roasting cylinders and agitates the same with a vibrating and up and down motion causing the coffee beans to jump as they are moved along exposed to the atmospheric air for cooling the same, and to remove stones or other heavy articles which may have been gathered up therewith.

With the above and other objects in view, the invention consists in certain novel combinations and arrangements of parts to be hereinafter described.

In the accompanying drawings:

Figure 8 is a detail perspective view of one end of the preheating cylinder on a reduced scale.

Figure 9 is an enlarged fragmentary sectional view taken on the section line 9—9 of Figure 3.

Figure 10 is a fragmentary elevation showing adjusting means for the roasting cylinders.

Figure 11 is an enlarged fragmentary front elevation showing ventilators for the roasting chambers, taken on the line 11—11 of Figure 3.

Figure 15 is a sectional perspective view showing the discharge chute for the roasting cylinders, the same being taken on the section line 15—15 of Figure 5.

Figure 16 is a longitudinal sectional view taken on the section line 16—16 of Figure 13.

Figure 17 is an enlarged sectional elevation showing one end of a roasting cylinder shaft which is adapted for adjustment to vary the angular inclination of each roasting cylinder, and Figure 18 is a sectional view of one of the bearings for the opposite ends of the roasting cylinder shafts which are held immovable, and Figure 19 is a section taken on line 19—19 of Figure 5.

Figure 1:
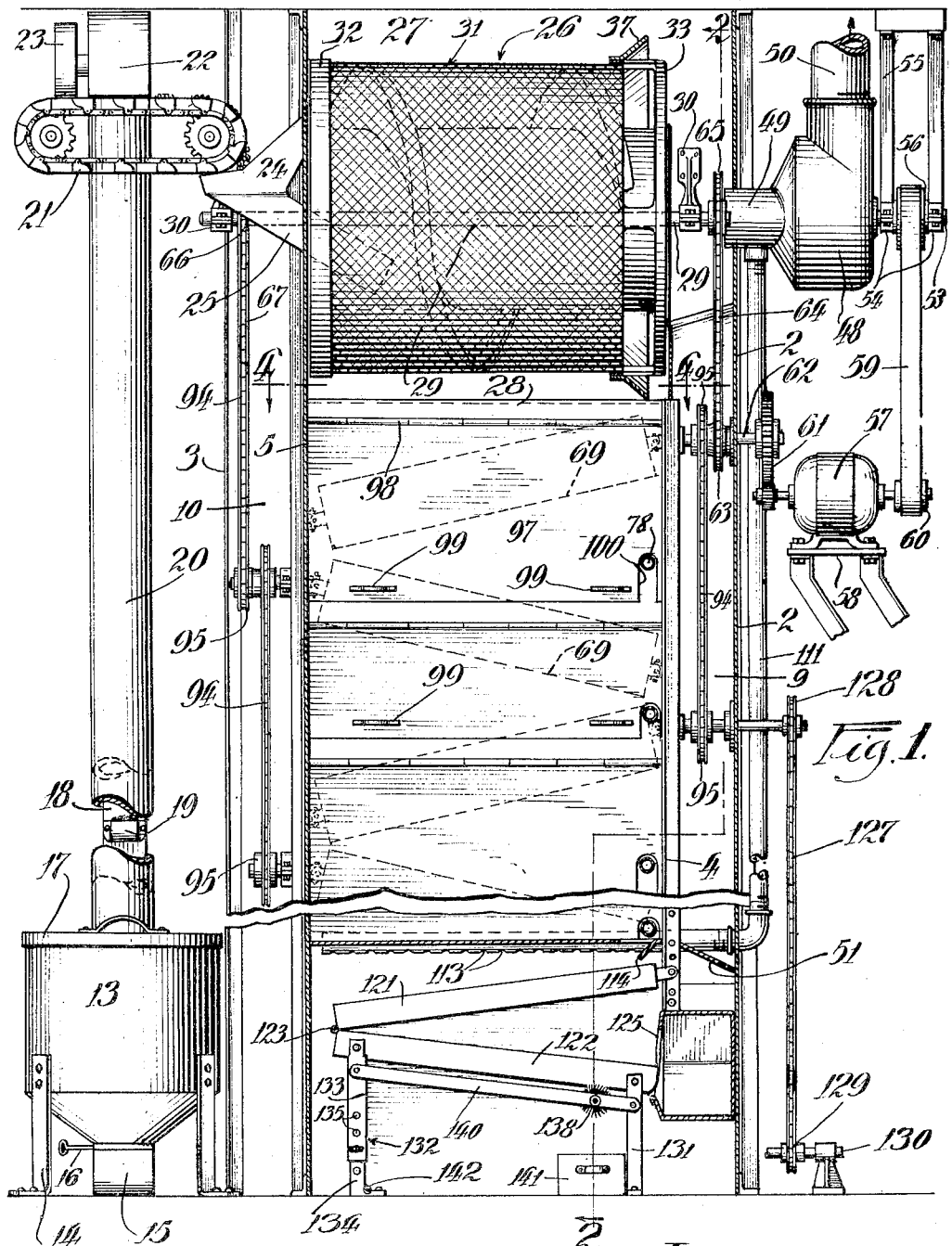
Figure 1 is a front elevation of a roasting machine constructed in accordance with the invention.

Referring to the drawings in detail, in which like reference characters designate corresponding parts throughout the several views, 1 designates in general a rectangular shaped housing enclosing and supporting the mechanism. This housing comprises the side walls 2 and 3 and spaced inwardly therefrom, inner walls 4 and 5 while the front wall is designated at 6 and the rear wall at 7, these walls being connected at the corners 8 but terminating spaced from the floor and having legs resting upon the floor to which they may be secured for anchoring the machine. The space 9 between the walls 2 and 4 constitutes a discharge chute for skins, chaff, shells, dirt and other foreign matter as will be later explained, while the space 10 between the walls 3 and 5 accommodates a drive mechanism at that side of the housing as does also the space 9 at the opposite side. The top or cover is indicated at 11 and the bottom at 12 spaced from the floor, thus providing corner legs in addition to the side walls therebeneath.

Arranged at one side of the housing is a hopper or bin 13 supported on suitable legs 14 and provided with suitable means indicated at 15 for feeding the coffee thereto controlled by valves 16. The cover is designated at 17 and an endless conveyor 18 having buckets or pockets 19 dipping in the hopper 13, operates in a conduit 20 extending through the cover 17 so as to feed the coffee or other product to be roasted, continuously upon an endless conveyor 21 through the discharge spout 22. The endless conveyor may be operated in any suitable way as by means of a pulley 23 driven by a suitable belt not shown, from which the endless carrier or conveyor 21 may be driven so as to discharge the coffee as shown particularly in Figure 1 of the drawings, into a hopper 24 supported by the adjacent side wall of the housing and having a chute 25 extending in an inclined position downwardly into a preheating and screening or cleaning cylinder 26. This cylinder 26 is mounted in a compartment 27 which may be termed a preheating and cleansing or cleaning compartment for the coffee and is divided off by the top wall of the housing and an intermediate wall 28 above the roasting cylinders to be hereinafter described. The cylinder 26 has a shaft 29 journaled horizontally in the housing in suitable bearings 30 and is of composite construction including an outer screen cylinder 31 arranged with hoops or bands 32 at its receiving end and with an end member 33 at the opposite end. The end member 33 has a flange 34 extending inwardly and provided with slots 35 and is secured at its inner end to the screen cylinder 31 as indicated at 36, together with a surrounding angularly extending rim 37 constituting a discharge chute in any position or rotation of the cylinder or shaft for chaff or other foreign particles escaping through the slots 35 as the cylinder rotates.

Within the cylinder 31 is a perforated sheet metal cylinder 38 having a series of regular or staggered perforations 38' therethrough and carrying internally a series of spirally arranged angular baffle plates 39 serving to agitate the coffee for the purpose of evenly distributing it over the cylinder 38 and to feed it along in passing therethrough during the preheating and cleaning operation. The cylinder 38 is mounted on a shaft 29 through the medium of hubs or collars 40 having radial rods or spokes 41 connected to the cylinder or a band 42 within the same and the discharge end of the cylinder 38 is preferably flared outwardly as indicated at 43 within the flange 44 at the central opening in the end member 3, to which the spokes 41 are also connected. The opposite end of the annular space between the screen cylinder 31 and the perforated cylinder 38 is closed by a cap or end screen 45 and the adjacent end of the cylinder 38 flanged as indicated at 46 thus providing a central opening around the shaft 29 through which the chute 25 extends so that the preheating and screening or cleaning cylinder may rotate therearound.

In the annular space between the cylinders 31 and 38 a spiral angular blade 47 is arranged constituting means for advancing the coffee, which passes through the openings or perforations in the cylinder 38 and into the screen cylinder 31. Exhaust or suction fan 48 is arranged without the casing or housing and has an inlet 49 extending through the adjacent side wall 2 so as to create a draft through the preheating and cleaning cylinder drawing along the silver skins and other chaff or light particles which are discharged through the outlet pipe 50 into a suitable dust collector not shown. Stones and larger particles which will not pass through perforations 38' are discharged by the flange 43 over a partition 50' and into the space between the walls 2 and 4 onto the inclined bottom chute 51 for collection in a suitable receptacle 52 from which it may be removed, while the coffee or other product to be roasted passes through the openings 38' into the screw or foraminous cylinder 31 and is discharged by the flanged chute 37 into the roasting cylinder therebeneath. The shaft of the suction or exhaust fan indicated at 53 is mounted in suitable bearings 54 hung from the ceiling or other structure above by the hangers 55 and carries a pulley 56 which may be driven from a motor 57 supported on a shelf or bracket structure 58 therebeneath, by means of an endless drive belt 59 which is also engaged around a pulley 60 on the shaft of the motor operated by an electrical circuit under suitable switch control.

A reducing gear 61 on the opposite end of the motor shaft serves to drive a shaft 62 carrying a sprocket wheel 63 engaged by an endless drive member or chain 64 which in turn engages a sprocket wheel 65 on the shaft 29 so as to drive the preheating and preroasting, cleaning and screening cylinder 26. A sprocket wheel 66 is also carried by the opposite end of the shaft 29 which is engaged by an endless drive chain or member 67.

Figure 5:
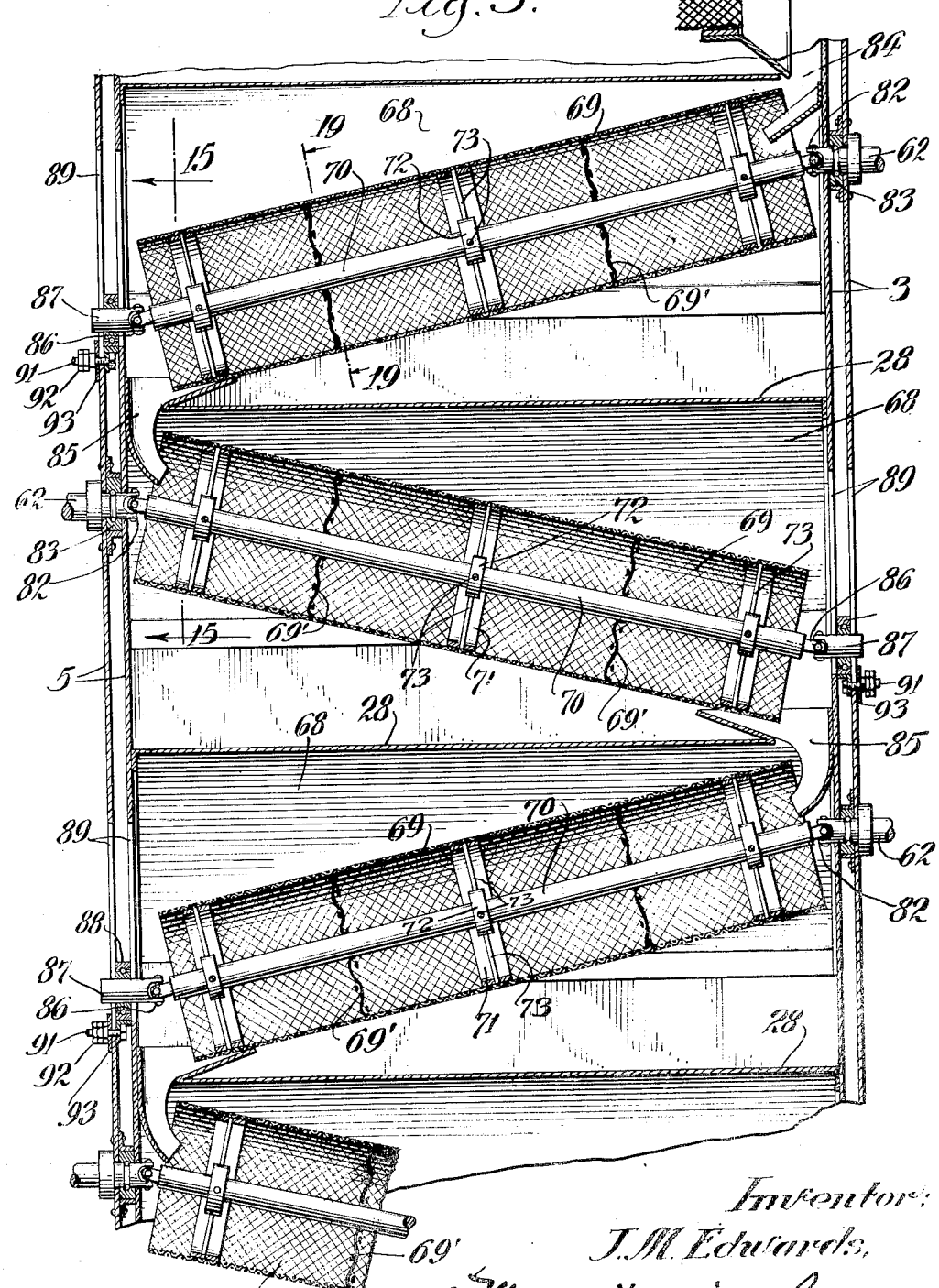
Figure 5 is an enlarged vertical sectional view taken on the section line 5—5 of Figure 3.
Figure 6:
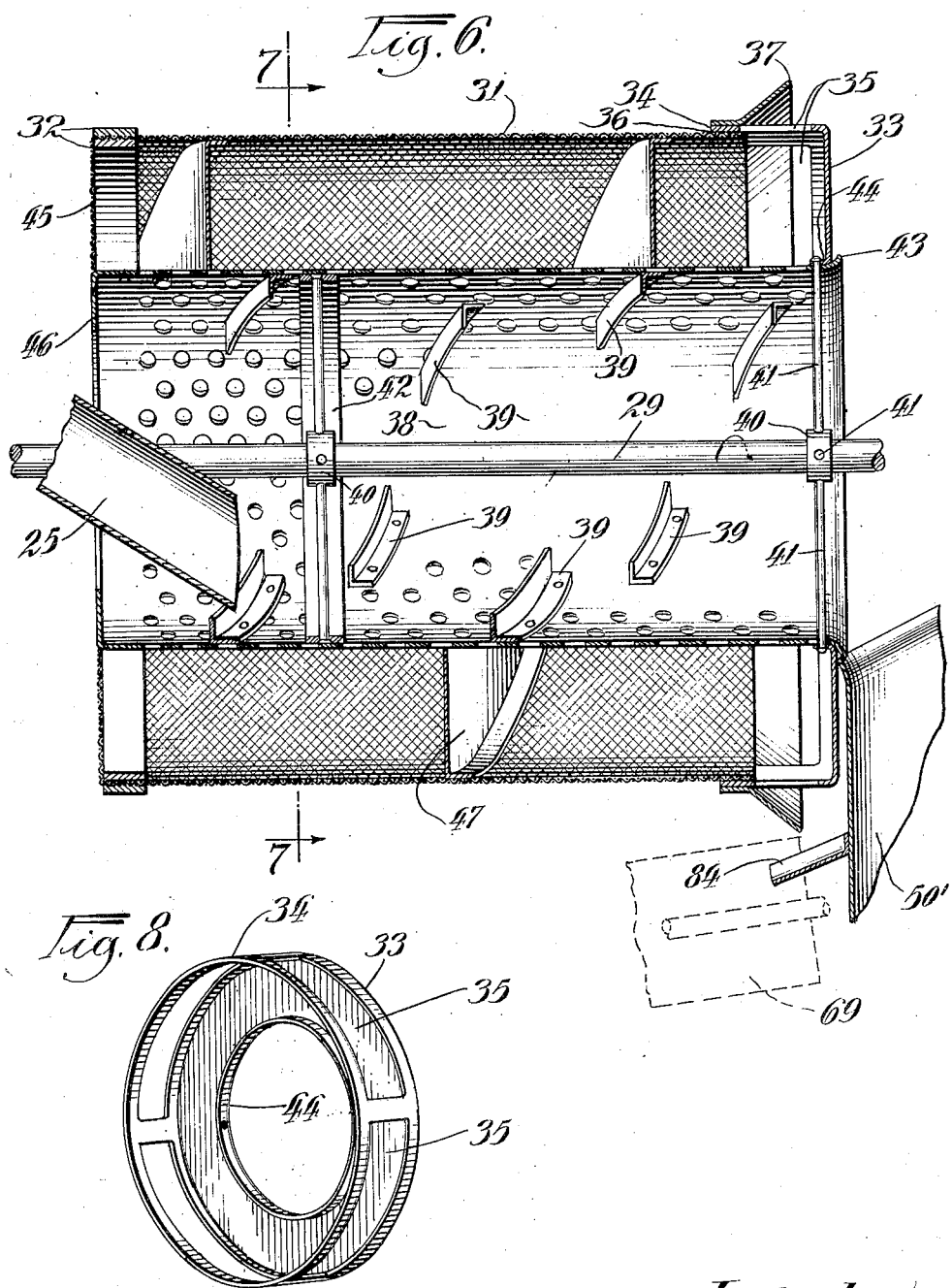
Figure 6 is an enlarged diametrical sectional view of the preheating and cleaning cylinder.
Figure 7:
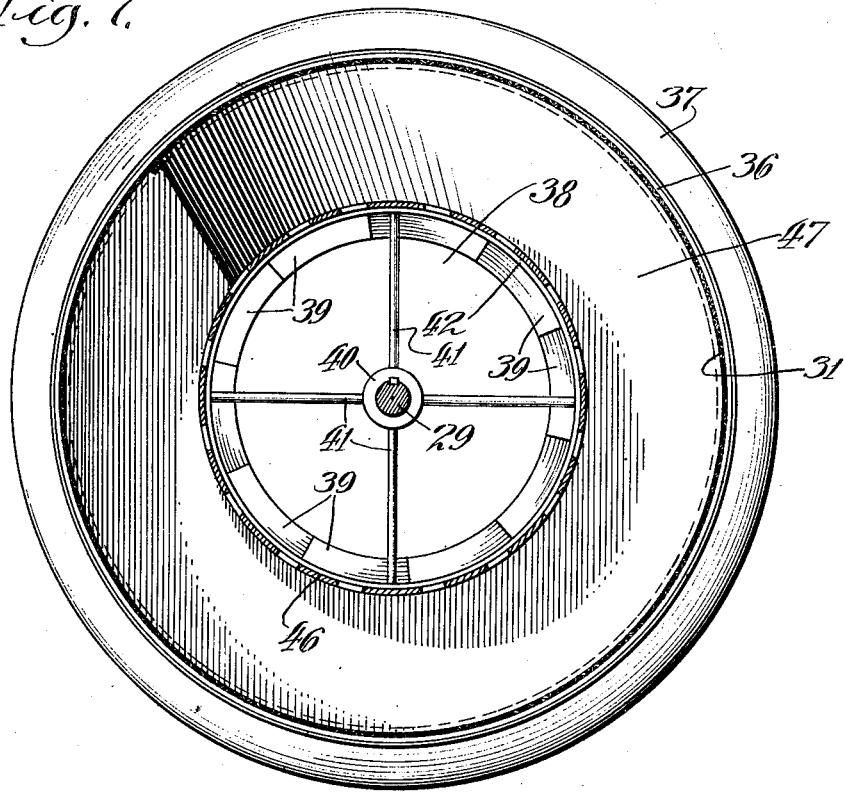
Figure 7 is a sectional view taken on the section line 7—7 of Figure 6.
Figure 12:
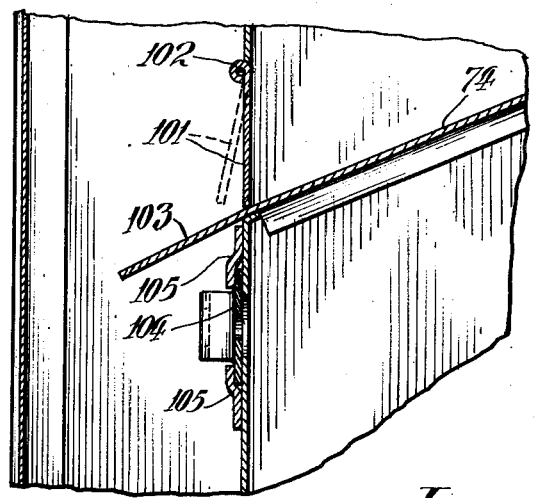
Figure 12 is a sectional view taken on the section line 12—12 of Figure 11.

Beneath the chamber 27 are a plurality of roasting chambers 68 in which are supported in superposed relation oppositely inclined toward each other, a plurality of roasting cylinders 69 of foraminous or screen material mounted on shafts 70 with internal bands 71 connected to the sleeves or hubs 72 by spokes 73 arranged at suitably spaced points and each supported within an independent compartment or roasting chamber produced by the upper wall 28 and intermediate angular walls 74 extending between the front and back walls of the housing. Cylinders 69 have foraminous partitions 69' of a mesh twice as large as the cylinders to permit the beans to pass and evenly distribute the same to insure better and more even roasting. These angular walls 74 are arranged one over the other as shown more particularly in Figures 3 and 5 of the drawings with relatively long, slightly inclined portions 75 and relatively short portions 76 extending at substantially right angles thereto in sharply inclined positions to the opposite side of the housing to form burner passages 77 for burners 78 at that side receiving the supply of gas from a pipe 79 controlled independently for each burner by valves 80. Within the passages 77 are arranged inclined parallel baffle burner plates 81 which may be of metal or stone, the stone being adapted to be heated to a red heat and the burners being of the Bunsen type so that there will be no gas and soot within the roasting compartments while providing a continuous uniform heat which may be regulated by determining the temperature of the respective compartments by suitable thermometers and controlling the burners accordingly. The upper ends of the shafts 70 of the respective roasting cylinders 69 are connected by universal couplings or joints 82 to short shaft sections 62 mounted in suitable bearings 83 in the double walls 3 and 5 provided at these points. The upper roasting cylinder 69 receives the coffee from the cylinder 26 through a chute 84 and the upper end of each shaft 70 is connected by a universal joint 82 to its respective fixed bearing 83. The chute 84 receives the coffee from the preheating and cleaning cylinder and chutes 85 are arranged so that it is successively discharged into the upper ends of the respective roasting cylinders 69 from the lower ends of those immediately above the cylinders 69 being located in inclined staggered relation. The upper end of each roasting cylinder 69, as above specified is held against adjustment but permitted to freely rotate by reason of the universal couplings or joints 82. The lower ends of the shafts are also provided with universal joints or couplings 86 connecting them to short shaft sections 87 which are rotatably mounted in suitable bearings preferably of the anti-friction type as indicated at 88 and which are vertically adjustable. For this purpose the walls are provided with slots 89 in which the bearings 88 for the shortened shaft ends 87 are slidable and may be vertically adjusted as seen more particularly in Figures 5 and 17. For adjustment, the supporting angular portions 90 of the bearings 88 carry bolts or other fastenings 91 which extend through the slots 89 and are provided with suitable lock nuts 92 and washers 93 to anchor the bearings 88 in any desired position according to the inclination desired for the roasting cylinders 69 which is determined by the speed at which it is desired that the coffee shall pass through the machine. From the shafts 62, the respective roasting cylinders are driven through drive chains 94 connecting sprocket wheels 95 on the respective shafts 70 at the upper ends of each.

The gas burner pipe 79 is preferably located without the housing and the branch pipes carrying the burners 78 and the valves 80 extend through openings 96 in the housing at that side, while the same side of the housing over each roasting chamber 68 is provided with doors 97 hinged at the top as indicated at 98 and having handles 99 at the bottom by which they may be raised, that is opened or closed and the lower edges of these doors have recesses 100 accommodating the pipes carrying the burners and valves 78 and 80 respectively so as to permit inspection and cleaning or the like.

The opposite side of the housing or sides of the respective roasting chambers 68 are provided with suitable ventilators including hinged sections or doors 101 hinged at 102 above the inclined walls 74, which project outwardly into the space between the respective walls at that side, as indicated at 103 for discharge clear of sliding apertured ventilator plates 104 positioned beneath each. These plates are slidable in guideways 105 above and below and provided with the apertures 106 adapted to aline with similar apertures 107 in the wall of each roasting chamber. This slide in each instance has a handle 108 by which it may be manipulated so as to adjust the apertures according to the degree of ventilation desired. Any skins, chaff or fine particles of foreign matter which are thus delivered through the doors 97 will drop onto an inclined discharge plate or chute 108 at the bottom of the chute space and may be caught into a suitable receptacle 109. The adjacent side of the housing is provided with a hinged door 110 for this purpose.

The suction fan 48 also operates by its connection through a pipe or conduit 111 which leads down along the outside of the casing and beneath the lower roasting chamber and bottom wall 112 of the housing and is provided with a number of openings 113 through which dust and other particles may be drawn for discharge through the outlet 50. This pipe is preferably provided with a shield 114 at the outer end of the opening 113 therein such shield being stamped at the bottom of the housing as disclosed more particularly in Figure 1 of the drawings. This shield 114 also constitutes a chute from which the roasted coffee is delivered into a cooling and cleaning device now to be described.

Figure 2:
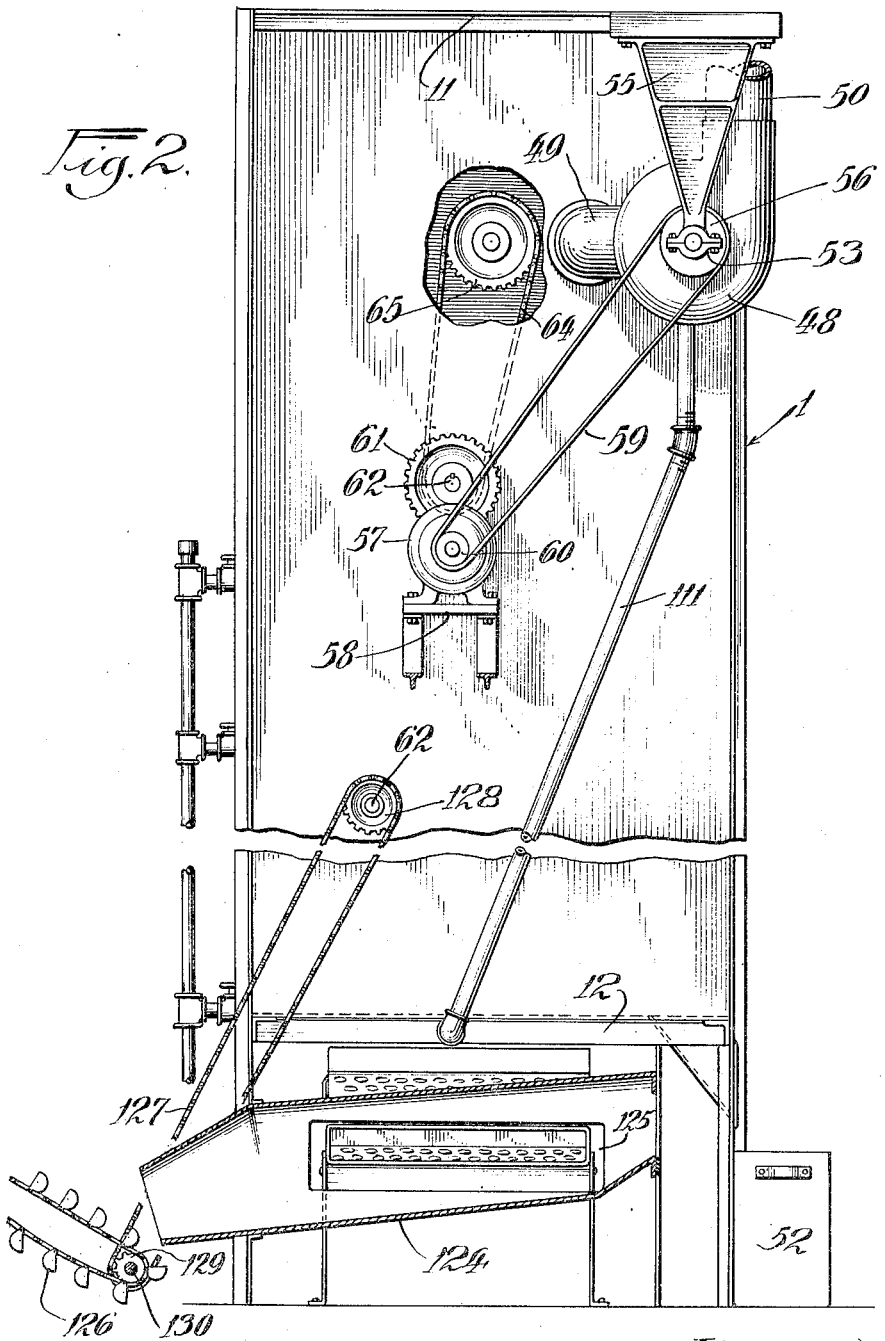
Figure 2 is a side elevation thereof partly broken away taken on the section line 2—2 of Figure 1.

This cleaning and cooling device is in the form of a shaker consisting of a corrugated pan 115 adjustably mounted at its upper end by means of arms 116 supported by a pair of depending hangers or brackets 118 suspended from the housing and provided with a plurality of apertures 119 to permit the necessary vertical adjustment. The pan 115 is provided with a series of alternate raised portions or projections forming bumps 120 and depressions 121 so as to cause the coffee to be thoroughly agitated and to jump thereon as it passes down this inclined pan onto a similar pan 122 disposed in an oppositely inclined relation therebeneath and hinged thereto at one end as indicated at 123. The latter pan then discharges into a receiving trough 124 through an opening 125 therein beneath the housing as disclosed more particularly in Figures 2 and 16, from which the coffee may be discharged onto an endless conveyor 126 to be conveyed off to the desired place. This conveyor is operated by an endless drive member or chain 127 trained around a sprocket wheel 128 on one of the non-adjustable shaft sections 62 of the shaft 70 and a sprocket wheel 129 mounted on a suitable shaft 130 journaled on the floor in a suitable bearing or otherwise. In order to actuate the shaker, the latter is mounted at one end of the pan 122 on legs or standards 131 and on the opposite end by means of adjustable flexible spring standards 132 comprising upper and lower sections 133 and 134, the upper sections telescoping or fitting over the lower sections and the lower sections having a plurality of apertures 135 permitting adjustment of the length thereof and accommodated in slot 136 of the upper section. The lower pan 122 is preferably provided with an opening or slot 137 in the bottom beneath which a rotatable cylindrical brush 138 rotatably supported on braces 140 connecting with the respective standards 131 and 132. This brush as it rotates as will be later described, will catch any heavy objects or foreign matter which may be drawn along with the coffee so as to discharge the same into a container or receptacle 141 therebeneath, as particularly shown in Figure 16 of the drawings. The standard 132 is preferably hinged to the floor as indicated at 142. In order to rotate or oscillate the brush 138, the shaft 143 is provided with an oppositely grooved enlargement or cylindrical portion 144 operating in sleeve 145 having an internal spline or rib 146 adapted to fit the groove as seen particularly in Figure 13.

Figure 3:
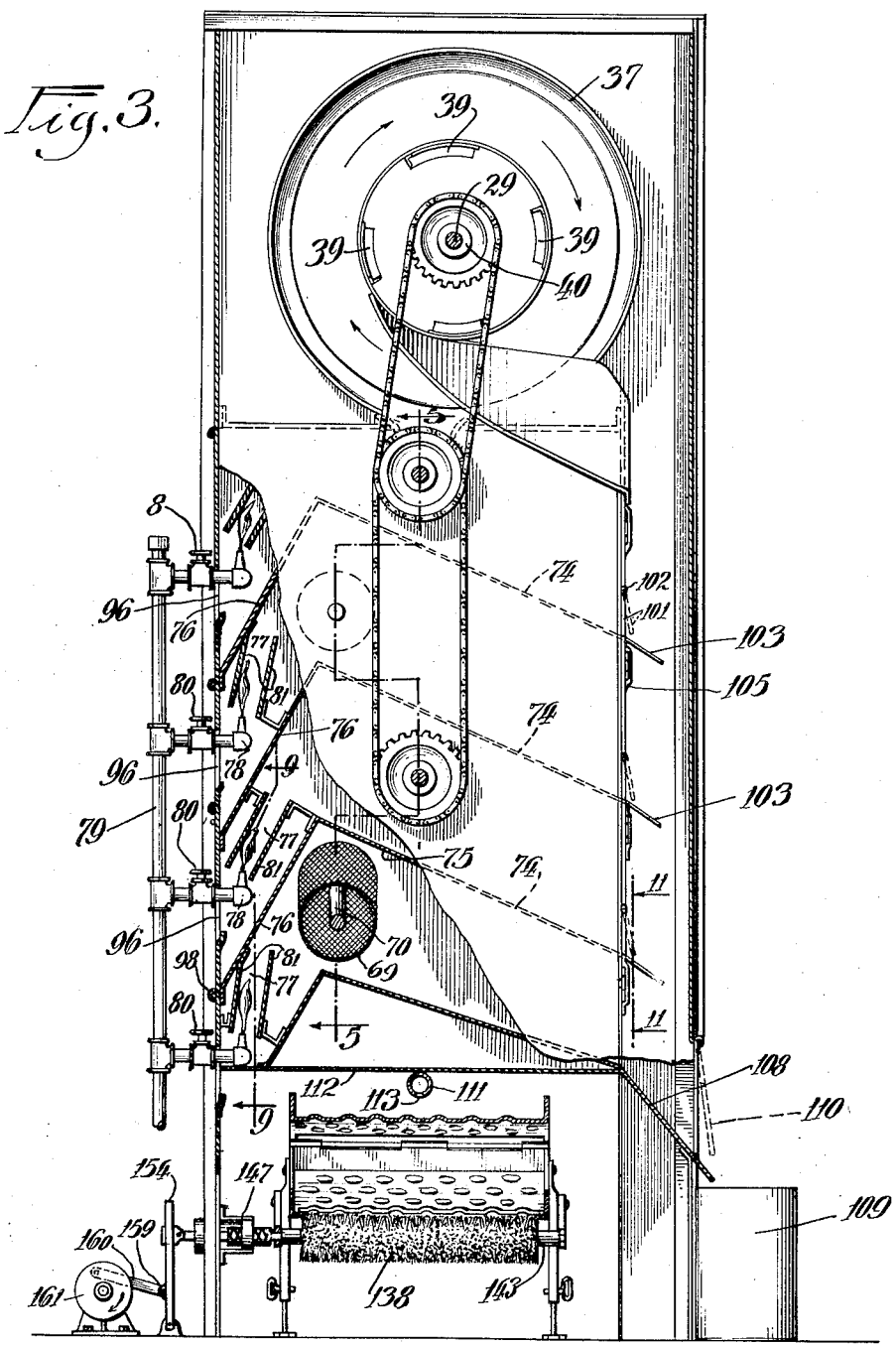
Figure 3 is an opposite side elevation partly broken away and in vertical section.
Figure 4:
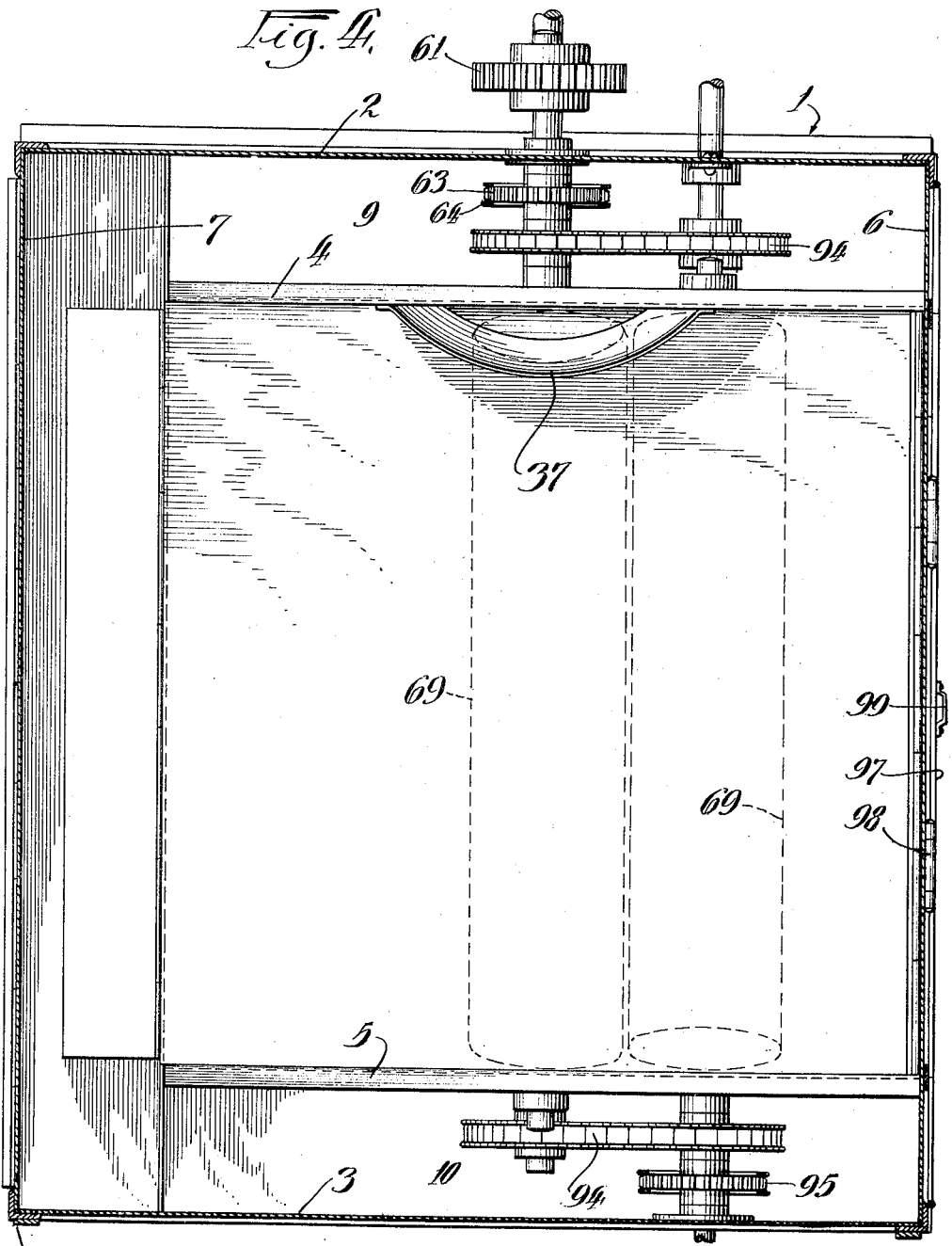
Figure 4 is an enlarged horizontal sectional view taken on the section line 4—4 of Figure 1.
Figure 13:
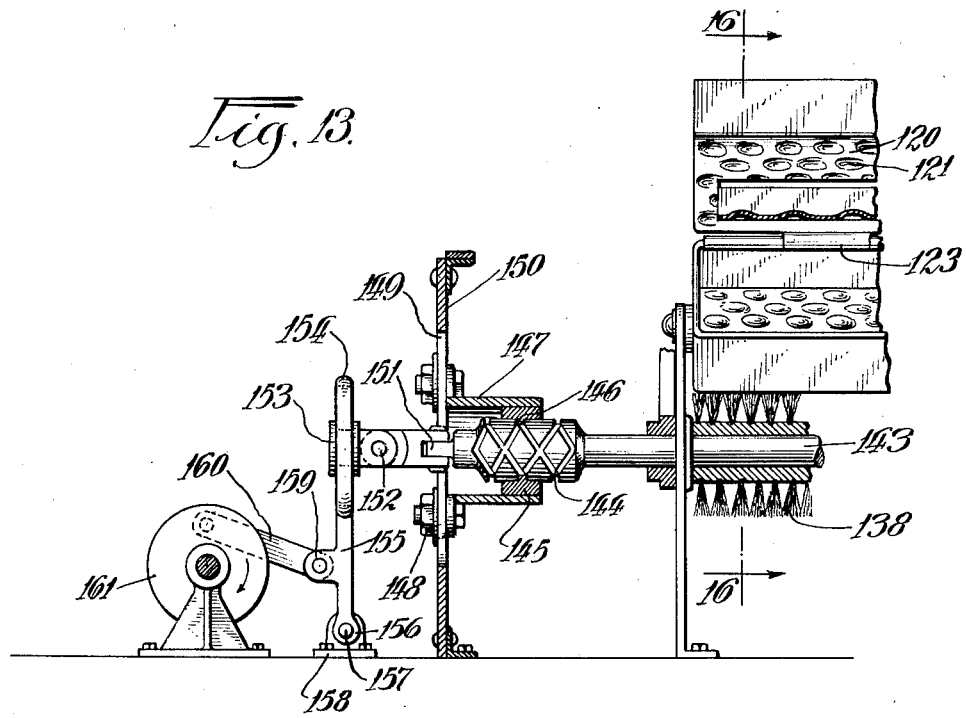
Figure 13 is an enlarged sectional elevation showing the cooling device and stoner and means of actuating the same.
Figure 14:
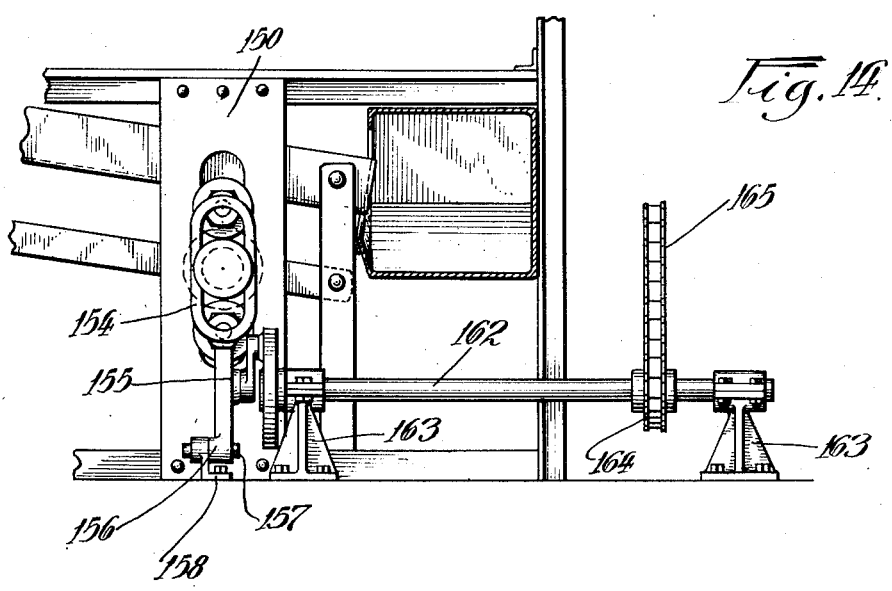
Figure 14 is an elevation partly in section at right angles to Figure 13.

The sleeve 145 is carried in a bearing 147 bolted as indicated at 148 in the manner of a bracket structure for vertical adjustment in a slot 149 of an upright support 150 which may constitute one side of the housing or a wall beneath one side thereof as shown particularly in Figures 3 and 13. This plate or wall through its slot 149 accommodates hinged connection 151 through the slot 149 of the wall or plate 150 having a further pivoted joint 152 which together with the joint 151 constitutes a substantially universal joint and the free end is provided with a grooved circular head or enlargement 153 receiving the upper slotted end or loop 154 of an arm 155 trunnioned or pivoted at its lower end on a pivot 157 carried by a bearing bracket 158 mounted on the floor. Connection is made at 159 to the arm 155 with a connecting rod 160 which is in turn connected to a crank disk or the like 161 by which oscillation is imparted to the arm 155, causing the shaft 143 and the brush 138 carried thereby to be rotatably driven in opposite directions as well as oscillated axially beneath the slot 137. The crank disc 161 is driven on a shaft 162 suitably journaled in bearings 163 on the floor (see Fig. 14) and carrying a sprocket wheel 164 around which is trained an endless belt or chain 165 driven from the shaft 130 or otherwise. In this way, not only is the coffee cleaned of heavy foreign objects, but is slowly cooled and any fine particles of dust, skins or chaff effectively removed therefrom by suction as well as gravity, in addition to the physical engagement of the rotating cylindrical brush 138 with said particles drawn through the slot 137. The coffee will therefore, be completely and properly cleaned and uniformly and gradually roasted according to requirements to bring out its best aroma or flavor and a continuous operation or roasting effected without permitting the coffee to pile up or bunch during such process or roasting as has been found objectionable with old methods and machines for this purpose, thereby avoiding these objections and resulting in complete and uniform roasting and thereby a uniform and high grade product.

While I have shown my invention in a preferred form, it is to be understood that various changes may be made in the construction, proportion and arrangement of the parts and also in the materials used, without departing from the spirit and scope of the invention.

What I claim is:

1. A coffee roaster comprising a support, a plurality of cylinders superposed in said support, the top cylinder being substantially horizontal and the other cylinders being inclined to the horizontal in opposite directions alternately, means for simultaneously rotating said cylinders in the same direction, means for delivering coffee to the top cylinder, means in said top cylinder for feeding coffee therethrough, means for transferring coffee from the lower end of each cylinder to the upper end of the cylinder immediately below, means for roasting the coffee moving by gravity through the inclined cylinders and for pre-heating the coffee in the top cylinder, and a foraminous partition extending entirely across each cylinder to retard the flow of beans and separate the beans from each other during said flow, said partition having a uniform mesh throughout its area sufficiently large to permit all the beans to pass therethrough.

2. A coffee roaster comprising a support, a plurality of cylinders superposed in said support, the top cylinder being substantially horizontal and the other cylinders being inclined to the horizontal in opposite directions alternately, means for vertically adjusting one end of each inclined cylinder to vary the horizontal inclination thereof, means for feeding coffee through the upper cylinder, means for transferring coffee from each cylinder to the cylinder immediately below it, and means for roasting coffee moving by gravity through the inclined cylinders and for pre-heating coffee in the top cylinder, and a foraminous partition extending entirely across each cylinder to retard the flow of beans and separate the beans from each other during said flow, said partition having a uniform mesh throughout its area sufficiently large to permit all the beans to pass therethrough.

3. In a coffee roaster, supporting means, a plurality of cylinders rotatably mounted in said support and vertically superposed, said cylinders being inclined to the horizontal in opposite direction alternately, means for simultaneously rotating all of said cylinders in the said direction, means for delivering coffee to the upper cylinder, means for continuously heating the coffee as it flows by gravity through said cylinders, and a foraminous partition extending entirely across each cylinder to retard the flow of beans and separate the beans from each other during said flow, said partition having a uniform mesh throughout its area sufficiently large to permit all the beans to pass therethrough.

4. A coffee roaster comprising a casing, a plurality of foraminous cylinders rotatably mounted in said casing, and inclined to the horizontal in opposite directions alternately, means for simultaneously rotating said cylinders in the same direction, means for vertically adjusting the lower end of each cylinder in the casing, baffles separating the cylinders from each other, means for directing heated air between said baffles and the cylinders immediately beneath them, means for removing the heated air and impurities from the casing, and a foraminous partition extending entirely across each cylinder to retard the flow of beans and separate the beans from each other during said flow, said partition having a uniform mesh throughout its area sufficiently large to permit all the beans to pass therethrough.

In testimony whereof I affix my signature.

JAMES M. EDWARDS.